United States Patent [19]

Jehn

[11] Patent Number: 5,446,635
[45] Date of Patent: Aug. 29, 1995

[54] LASER ASSEMBLY FOR MARKING A LINE ON A WORKPIECE FOR GUIDING A CUTTING TOOL

[75] Inventor: E. F. Jehn, Taipei, Taiwan
[73] Assignee: Quarton, Inc., Taipei, Taiwan
[21] Appl. No.: 80,813
[22] Filed: Jun. 24, 1993
[51] Int. Cl.⁶ ........................... H01S 3/00; F21V 21/00
[52] U.S. Cl. ........................... 362/259; 83/521; 372/109
[58] Field of Search ........... 219/121.6, 121.73, 121.75; 372/109; 362/259, 362, 368, 372, 374, 375; 83/520, 521

[56] References Cited

U.S. PATENT DOCUMENTS 5,056,097  10/1991  Meyers ........................ 362/259
5,285,708   2/1994  Bosten et al. ................. 83/520

Primary Examiner—Geoffrey S. Evans
Attorney, Agent, or Firm—Browdy and Neimark

[57] ABSTRACT

A laser marker including a laser marker body to hold a battery power supply and a control circuit, a laser module pivotably connected to the laser marker body and controlled by a push-button switch of the control circuit board to emit a laser beam, a set of laser firing caps alternatively mounted on the laser module to refract the laser beam by a respective plano-convex length of different focal length for marking a line of light on a workpiece for guiding a cutting tool to cut the workpiece. The laser module can be turned on laser marker body around the X-axis; the laser firing cap can be turned on the laser module around the Y-axis.

1 Claim, 9 Drawing Sheets

LASER ASSEMBLY FOR MARKING A LINE ON A WORKPIECE FOR GUIDING A CUTTING TOOL

BACKGROUND OF THE INVENTION

The present invention relates to a laser marker for drawing a line of light on a workpiece to guide a cutting tool to cut the workpiece. The thickness of the line of light can be adjusted by using a different laser firing cap.

Various cutting machines are known and widely used for cutting any of a variety of materials. Before cutting, workpieces must be properly measured and drawn with lines for cutting. However, it is not easy to draw a line on a workpiece having a rugged outer surface. There are precision laser cutting machines which automatically draw a line of light on the workpiece to guide the cutting tool to cut the workpiece precisely. Because these precision laser cutting machines are very expensive, they are not suitable for small scale processing work shops.

SUMMARY OF THE INVENTION

The present invention has been accomplished under the aforesaid circumstances. It is one object of the present invention to provide a laser marker which uses a laser module to project a laser beam through a plano-convex lens for drawing a line of light on the outside surface of any of a variety of workpieces of any of a variety of shapes for guiding the cutting tool of a cutting machine for cutting. It is another object of the present invention to provide a laser marker which includes a set of laser firing caps alternatively mounted on the laser module for refracting the laser beam of the laser module for marking a line of light on the workpiece, each laser firing cap having a respective plano-convex lens of different focal length. It is still another object of the present invention to provide a laser marker which can be conveniently adjusted to change the position of the plano-convex lens of the laser firing cap being used along the X-axis as well as the Y-axis. It is still another object of the present invention to provide a laser marker which has a double-sided adhesive tape fastened thereto for mounting on a flat mounting surface. It is still another object of the present invention to provide a laser marker which is inexpensive to manufacture.

DETAILED DESCRIPTION OF THE PREFERRED EMBODIMENT

Figure 1:
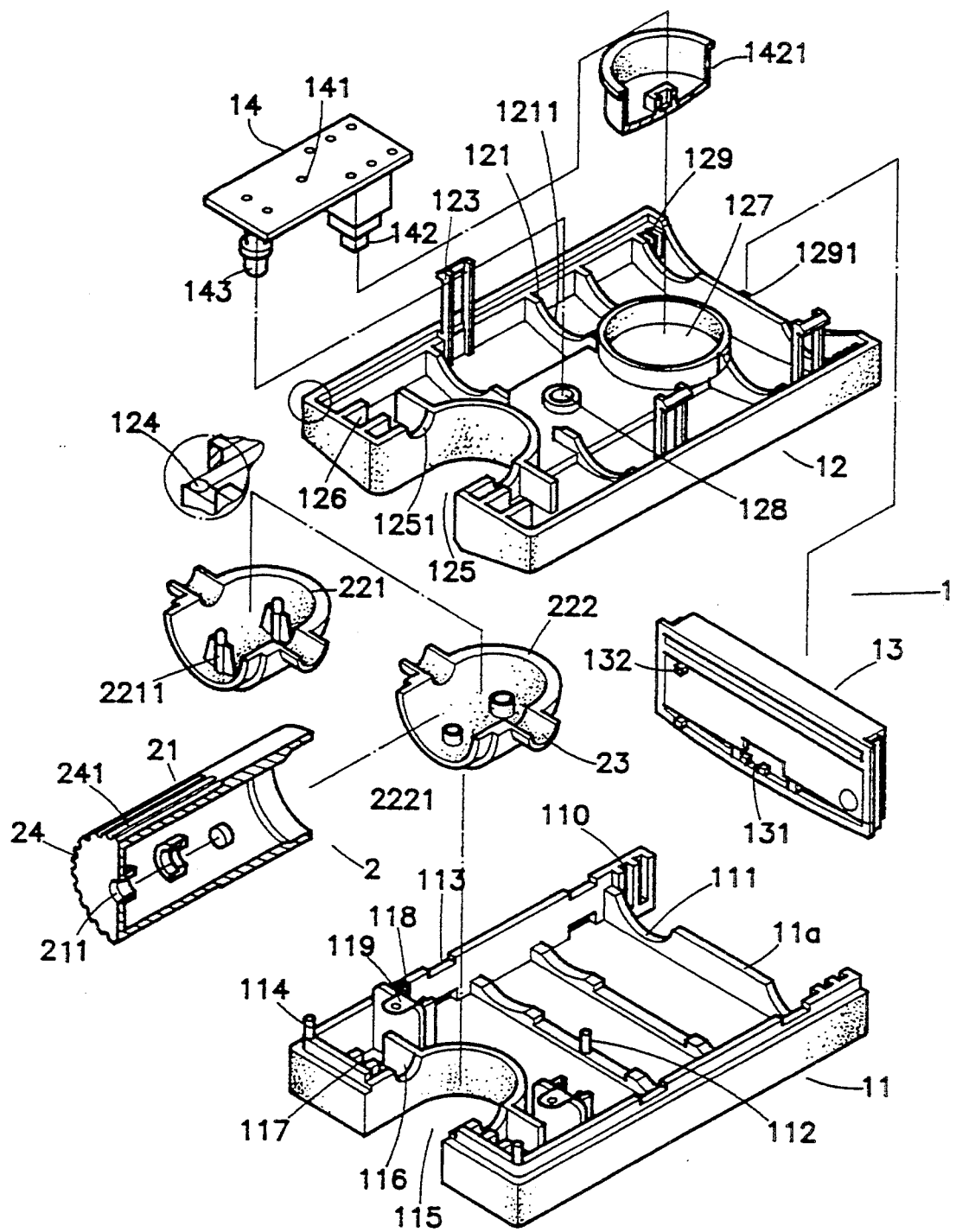
FIG. 1 is an exploded view of a laser marker according to the preferred embodiment of the present invention (the set of laser firing caps excluded)
Figure 2:
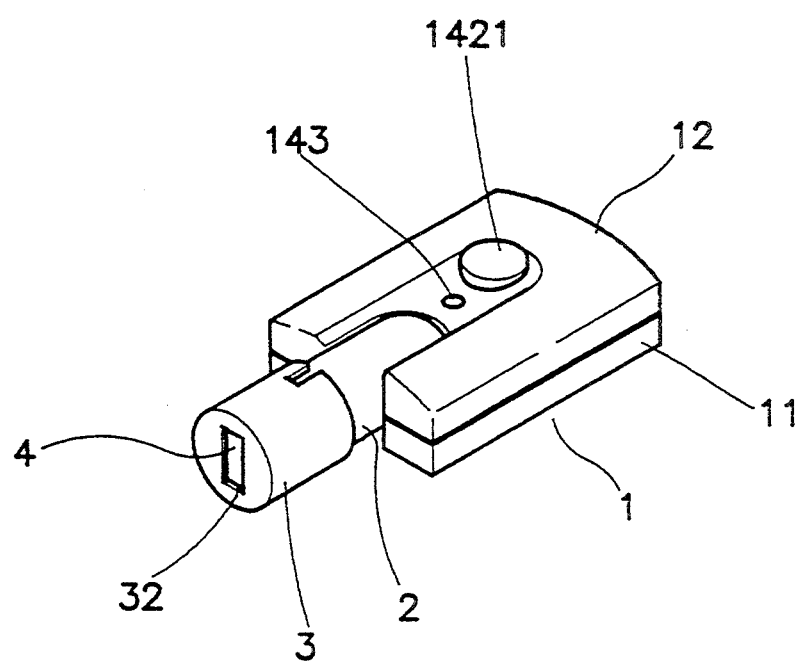
FIG. 2 is an elevational view of the laser marker.
Figure 3:
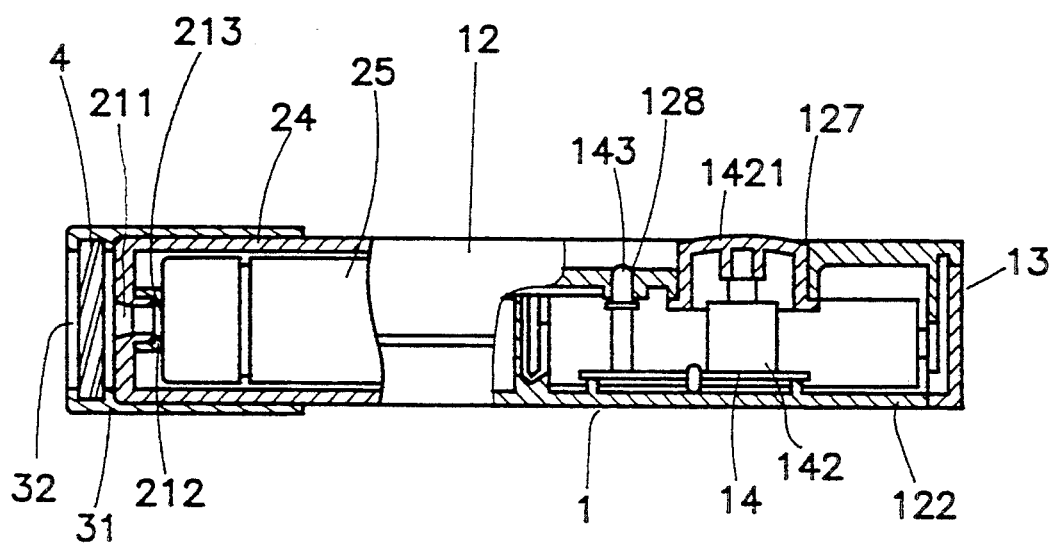
FIG. 3 is a longitudinal sectional view of the laser marker.
Figure 4:
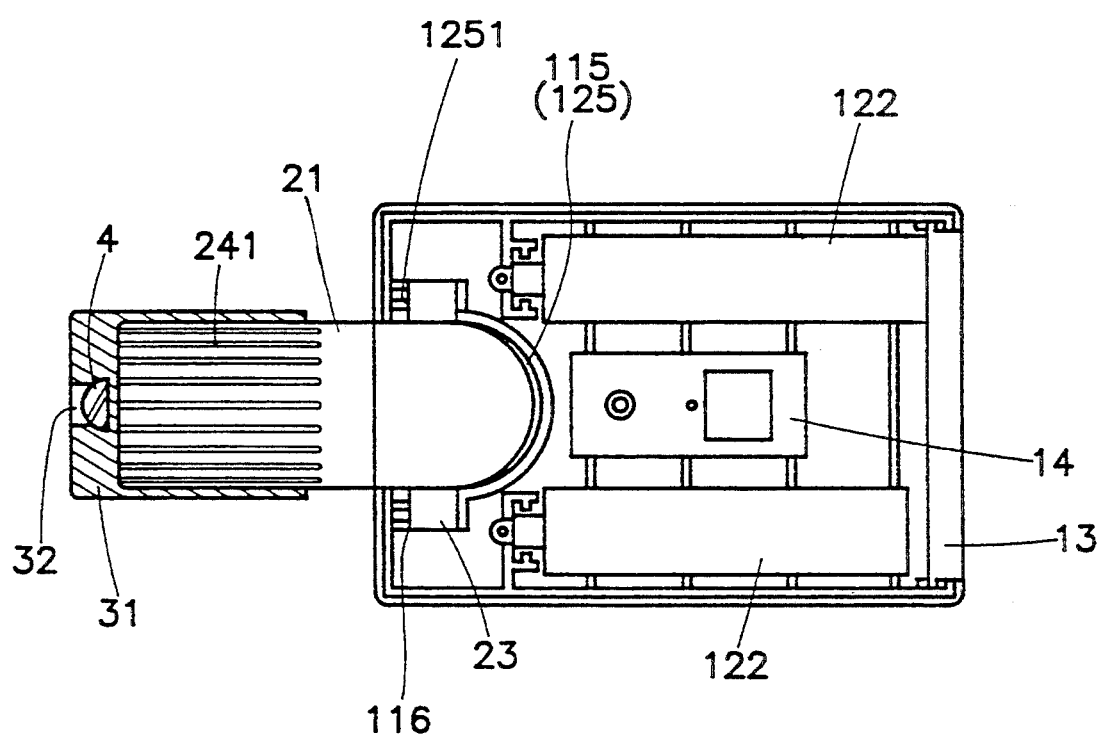
FIG. 4 is a top plan view of the laser marker.
Figure 5:
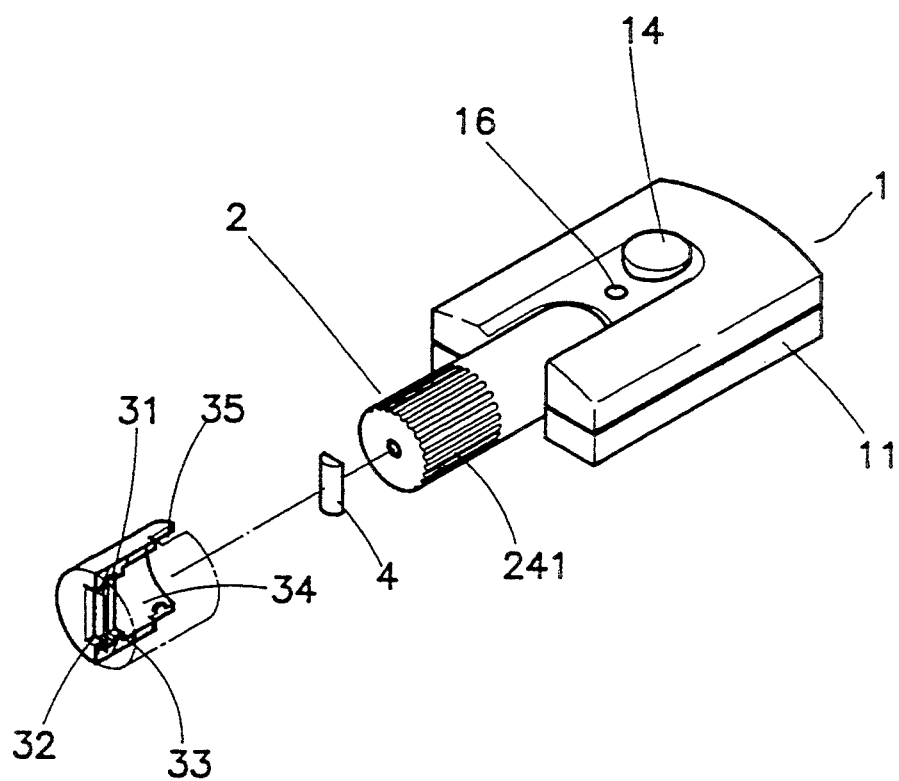
FIG. 5 is an exploded and partial broken-away view of a laser firing cap according to the present invention.

Referring to FIGS. 1, 2, 3, 4 and 5, a laser marker is generally comprised of a laser marker body 1, a laser module 2, a set of laser firing caps 3. The laser marker body 1 is comprised of a substantially rectangular bottom cover 11, a top cover 12 fitting over the bottom cover 11, a battery lid 13, and a control circuit board 14.

The bottom cover 11 comprises a plurality of transversely spaced parallel division boards 11a, pairs of half-round recesses 111 respectively formed on the division boards 11a at the top, an upright center locating pin 112 in the middle, pairs of opposite retaining notches 113 symmetrically disposed on two opposite lateral sides thereof at the top, two upright front pins 114 bilaterally disposed on the front side thereof, a smoothly curved front opening 115 on the front side thereof in the middle, two opposite axle supports 116 disposed on two opposite sides by the front opening 115, two retaining holes 117 respectively disposed between the front pins 114 and the axle supports 116, two contact metal plates 119 respectively fastened to two holder frames 118 being bilaterally spaced between the axle supports 116 and the division boards 11a, and a rear opening 110 transversely disposed on the rear side thereof.

The top cover 12 comprises pairs of half-round recesses 1211 on pairs of spaced division boards 121 thereof respectively fitted over the the half-round recesses 111 on the division boards 11a of the bottom cover 11 to hold dry battery cells 122, pairs of opposite side hooks 123 respective hooked on the retaining notches 113 of the bottom cover 11, two pin holes 124 bilaterally disposed on the front side thereof into which the upright front pins 114 fit respectively, a smoothly curved front opening 125 on the front side thereof in the middle fitted over the front opening 115 of the bottom cover 11 at the top, two opposite axle supports 1251 disposed on two opposite sides by the front opening 125 and respectively fitted over the axle supports 116 on the bottom cover 11, two retaining holes 126 vertically and respectively aligned with the retaining holes 117 on the bottom cover 11, a push-button mounting hole 127 and a lamp hole 128 spaced in the middle, a rear opening 129 disposed on the rear side thereof fitted over the rear opening 110 on the bottom cover 11 to hold the battery lid 13, and a rear hook 1291 in the middle of the rear opening 129.

The battery lid 13 is received in the rear openings 110;129 of the bottom and top covers 11;12, having a hooked portion 131 hooked with the rear hook 1291 on the top cover 12 and a small projection 132 to prevent reverse installation of dry battery cells.

The control circuit board 14 comprises a center pin hole 141, into which the upright center locating pin 112 fits, a push-button switch 142 with a push-button 1421, the push-button 1421 being extended out of the top cover 12 through the push-button mounting hole 127, and an indicator lamp 143 extended out of the top cover 12 through the lamp hole 128.

The laser module 2 comprises a cylindrical casing 21 fastened to the axle supports 116;1251 of the bottom and top covers 11;12 of the laser marker body 1 by two symmetrical half-round mounting sockets 221;222. The cylindrical casing 21 comprises a front projecting hole 211, a unitary lens holder 212 on the inside, a protective glass 212 fastened to the unitary lens holder 212 and shut in the front projecting hole 211. The half-round mounting sockets 221;222 are connected by fitting respective pins 2211 into respective pin holes 2221 to hold the cylindrical casing 21 in the front openings 115;125 of the bottom and top covers 11;12. The half-round mounting sockets 221;222 have opposite3 pivots 23 respectively fastened to the axle supports 116;1251 and pivotably retained between the bottom and top covers 11;12. The cylindrical casing 21 further comprises a plurality of longitudinal grooves 241 equiangularly spaced around the peripheral wall 24 thereof. The number of the longitudinal grooves 241 is twenty four, and therefore the pitch between either two adjacent longitudinal grooves 241 is 15° angle. The laser module 2 further comprises a laser diode 25, a lens (not shown) and a sealing ring (not shown) respectively fastened into the cylindrical casing 21.

The set of laser firing caps 3 includes a plurality of laser firing caps 31. Each laser firing cap 31 comprises a laser firing hole 32 on the closed front end thereof, a lens chamber 33 communicated with the laser firing hole 21, a plano-convex lens 4 received in the lens chamber 33, a rear mounting hole 34 which receives the cylindrical casing 21 of the laser module 2, and a positioning rib 35 raised from the peripheral wall of the rear mounting hole 34 and engaged into either longitudinal groove 241 on the peripheral wall 24 of the cylindrical casing 21 of the laser module 2 for positioning. The plano-convex lens 4 of either laser firing cap 31 is different in focal length. Therefore different laser firing cap 31 may be used according to different purposes.

Figure 6:
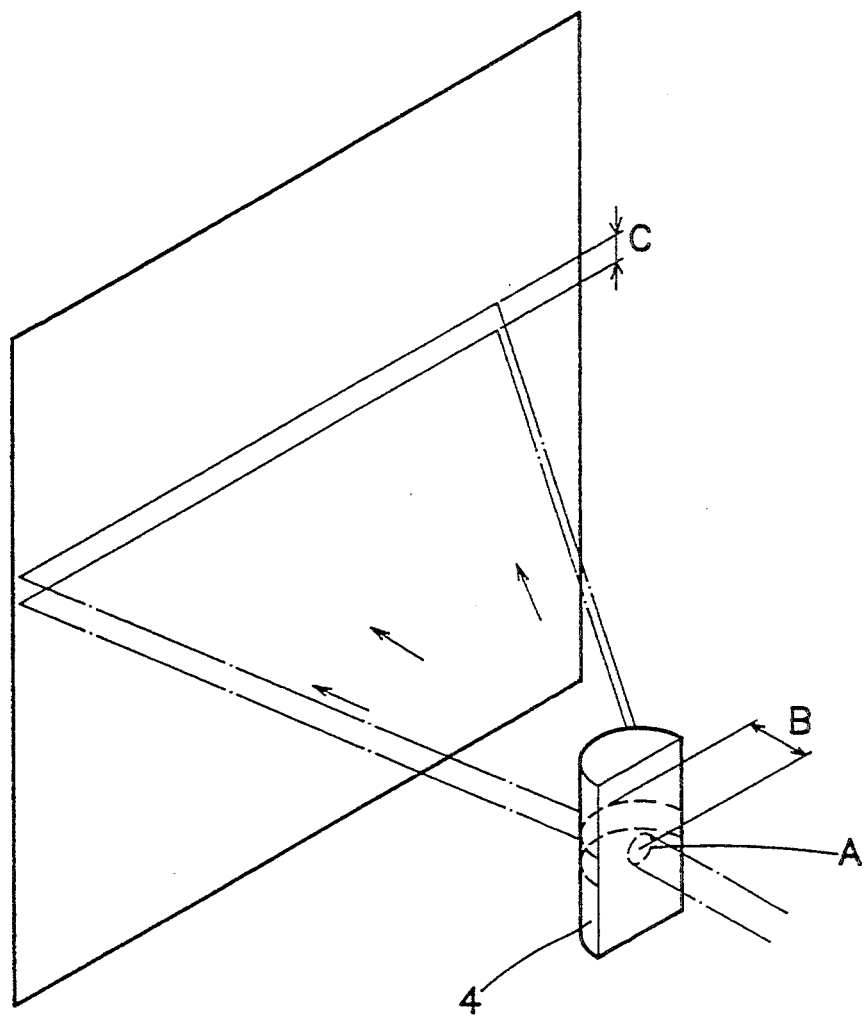
FIG. 6 illustrates a laser beam refracted through a plano-convex lens to mark a line of light on a workpiece.

Referring to FIG. 6, the focal length B between the focal spot A of the laser beam from the laser module 2 on the rear plain surface of the plano-convex lens 4 of either laser firing cap 31 and the front convex surface thereof determines the thickness of the line C drawn by the laser beam projected onto the workpiece through the plano-convex lens 4. Therefore, when a different laser firing cap 31 is used and fastened to the cylindrical casing 21 of the laser module 2, a line of different thickness is drawn on the workpiece by the laser module 2.

Figure 7:
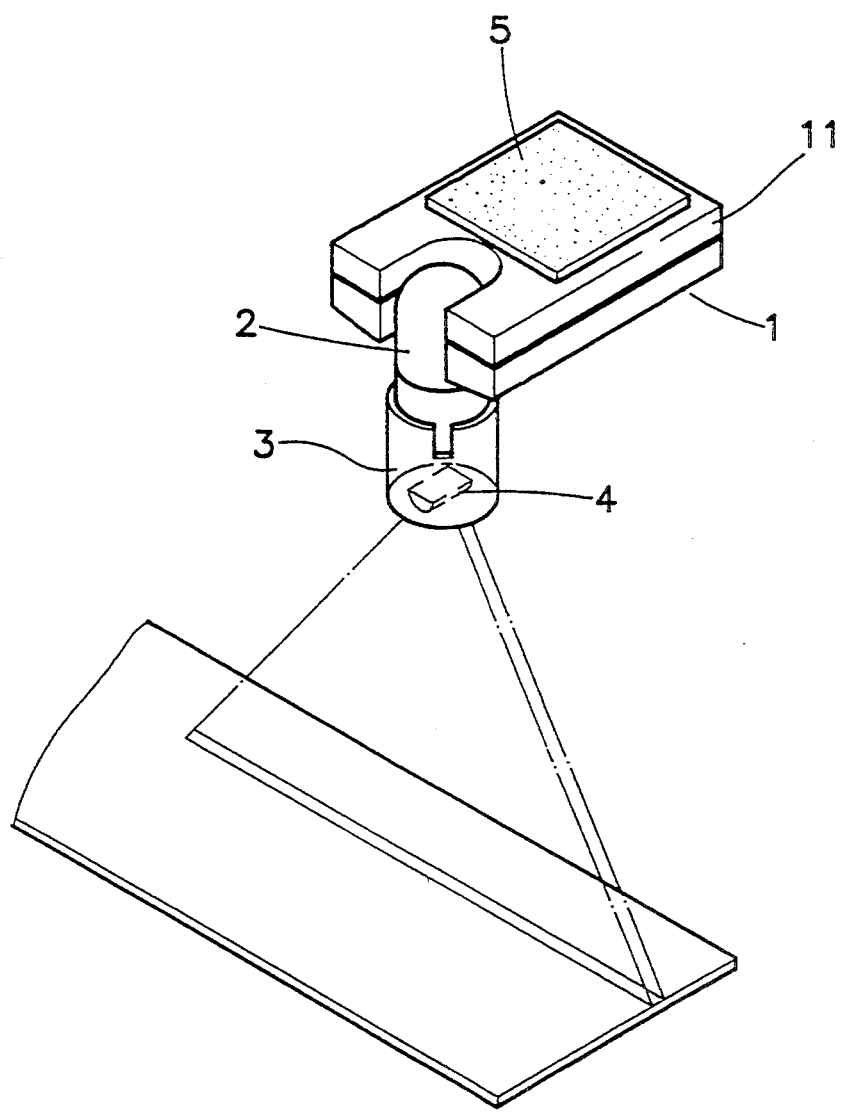
FIG. 7 is a schematic drawing showing the laser marker triggered to draw a line of light on a flat surface.
Figure 8:
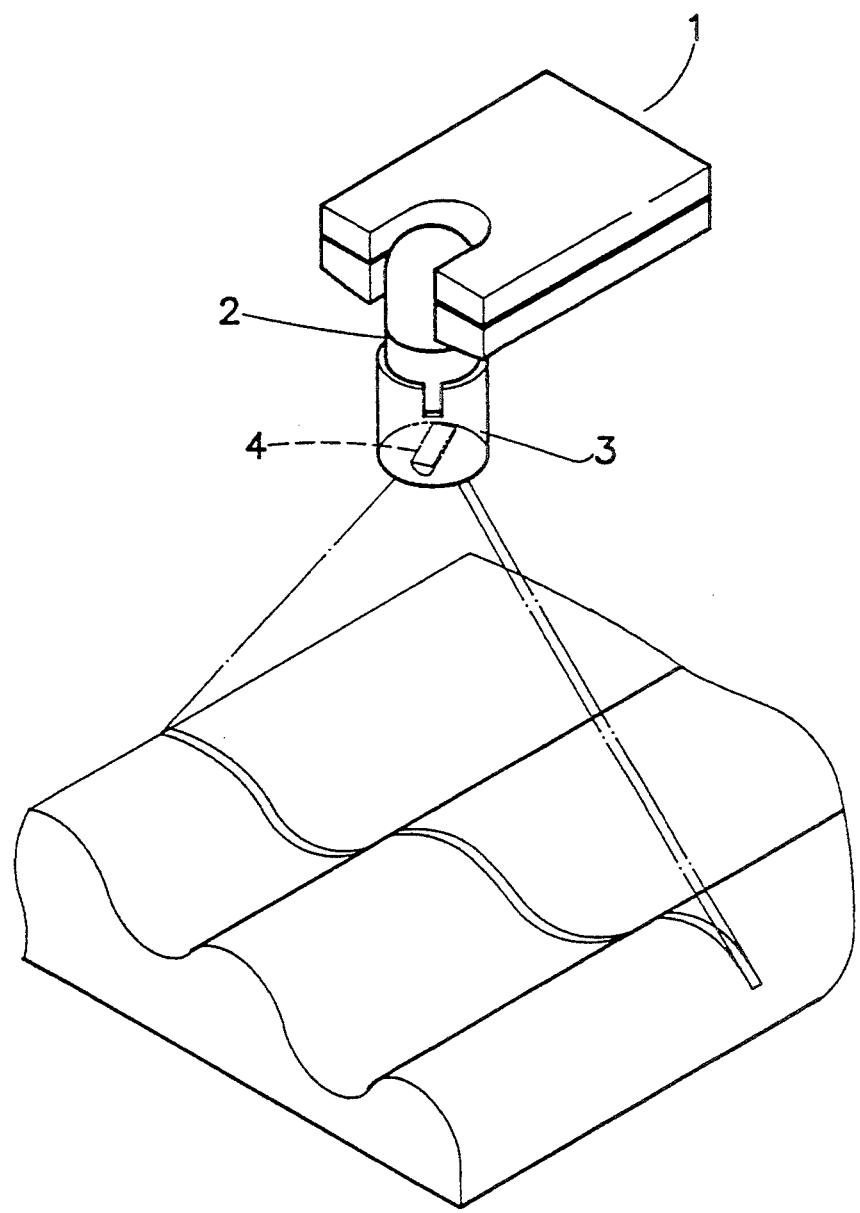
FIG. 8 shows the laser marker triggered to draw a line of light on a rugged surface.
Figure 9:
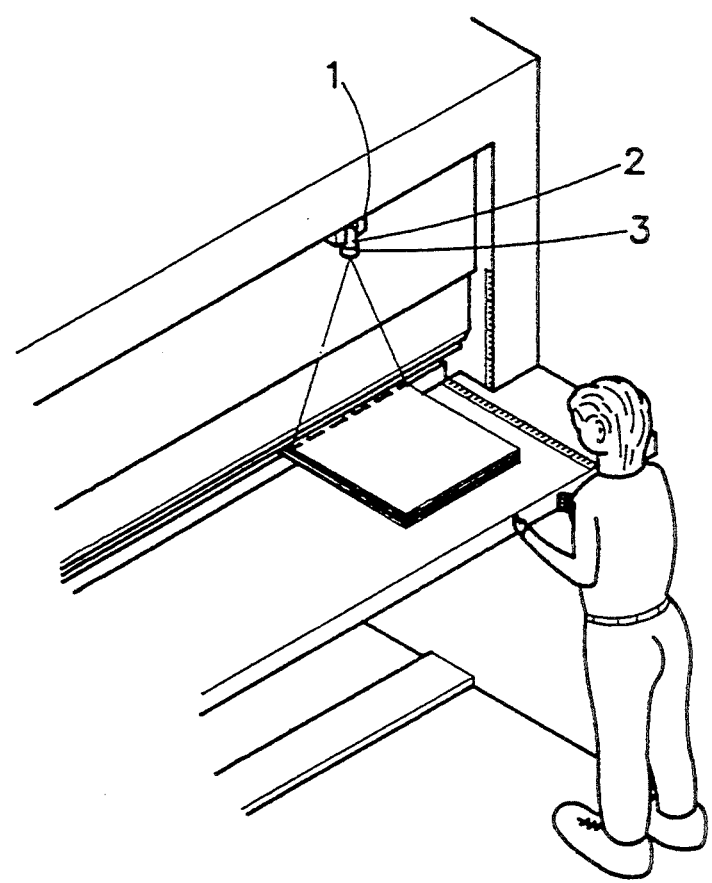
FIG. 9 is an installed view shown the laser marker fastened to a cutting machine at the top and triggered to draw a line of light on a workpiece below.

Referring to FIGS. 7, 8 and 9, the bottom cover 11 is attached with a double-sided adhesive tape 5 for mounting on a flat surface. As the push-button 1421 is pressed on, electric current is transmitted from the dry battery cells 122 to the control circuit board 14 to turn on the indicator lamp 143, and at the same time, the laser diode 25 is electrically connected to project a laser beam through the projecting hole 211 toward the plano-convex lens 4 on the laser firing cap 31 being mounted on the cylindrical casing 21 of the laser module 2. Through the plano-convex lens 4, a line of light is marked on the workpiece. The thickness of the line of light being marked on the workpiece can be adjusted by changing the laser firing cap 41. By engaging the positioning rib 35 from one longitudinal groove 241 on the cylindrical casing 21 to another, the angular position of the plano-convex lens 4 is changed relative to the laser module 2, namely, the plano-convex lens 4 can be turned through 360° angle around the Y-axis step by step at a 15° angle interval. As the laser module 2 is pivotably fastened to the laser marker body 1, the plano-convex lens 4 can also be turned around the X-axis through 180° angle.

While only one embodiment of the present invention has been shown and described, it will be understood that various modifications and changes could be made without departing from the spirit and scope of the invention.

What is claimed is:

1. A laser marker comprising:

a laser marker body, said laser marker body being comprised of a substantially rectangular bottom cover, a top cover covered on said bottom cover, a battery lid, and a control circuit board, said bottom cover comprising a plurality of transversely spaced parallel division boards, pairs of half-round recesses respectively formed on the division boards at the top, an upright center locating pin in the middle, pairs of opposite retaining notches symmetrically disposed on two opposite lateral sides thereof at the top, two upright front pins bilaterally disposed on a front side thereof, a smoothly curved front opening on the front side thereof in the middle, two opposite axle supports disposed on two opposite sides by the front opening, two contact metal plates respectively fastened to two holder frames being bilaterally spaced between the axle supports and the division boards, and a rear opening transversely disposed on a rear side thereof, said top cover comprising pairs of half-round recesses on pairs of spaced division boards thereof respectively fitted over the half-round recesses on the division boards of said bottom cover to hold dry battery cells between said top and bottom covers, pairs of opposite side hooks respective hooked on the retaining notches of said bottom cover, two pin holes bilaterally disposed on the front side thereof into which the upright front pin of said bottom cover fit respectively, a smoothly curved front opening on the front side thereof in the middle fitted over the front opening of said bottom cover at the top, two opposite axle supports disposed on two opposite sides by the front opening thereof and respectively fitted over the axle supports of said bottom cover, a push-button mounting hole and a lamp hole spaced in the middle, a rear opening disposed on a rear side thereof fitted over the rear opening on said bottom cover to hold said battery lid, and a rear hook in the rear opening thereof in the middle, said battery lid being received in the rear openings of said bottom and top covers and having a hooked portion hooked with the rear hook on said top cover and a small projection to prevent reverse installation of dry battery cells, said control circuit board comprising a center pin hole into which the upright center locating pin of said bottom cover fits, a push-button switch controlled by a push-button extended out of the push-button mounting hole of said top cover, and an indicator lamp extended out of the lamp hole of said top cover;

a laser module pivotably fastened to said laser marker body and electrically connected to said control circuit board, said laser module comprising a cylindrical casing fastened to the axle supports of said top and bottom covers by two symmetrical half-round mounting sockets to hold a laser diode and a lens behind a front projecting hole thereof, said cylindrical casing comprising a plurality of longitudinal grooves equiangularly spaced around the periphery; and a set of laser firing caps alternatively mounted on said cylindrical casing of said laser module, each laser firing cap comprising a laser firing hole in line with the projecting hole on said cylindrical casing of said laser module, a plano-convex lens disposed between the laser firing hole thereof and the projecting hole on said cylindrical casing of said laser module, a rear mounting hole, which receives said cylindrical casing of said laser module, and a positioning rib engaged into either longitudinal groove on said cylindrical casing of said laser module for positioning; the plano-convex lens of each of said laser firing caps having a different focal length;

whereby pressing on the push-button of said push-button switch of said control circuit board causes said laser diode to emit a laser beam through the plano-convex lens on the laser firing cap being mounted on said laser module for drawing a line of light on a workpiece for guiding a cutting tool to cut said workpiece.

* * * * *